(12) United States Patent
Kuenzner et al.

(10) Patent No.: US 10,155,446 B2
(45) Date of Patent: *Dec. 18, 2018

(54) MOTOR VEHICLE OPERATING DEVICE

(75) Inventors: Hermann Kuenzner, Freising (DE); Armin Distler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 921 days.

This patent is subject to a terminal disclaimer.

(21) Appl. No.: 12/983,490

(22) Filed: Jan. 3, 2011

(65) Prior Publication Data

US 2011/0107262 A1 May 5, 2011

Related U.S. Application Data

(63) Continuation of application No. PCT/EP2009/004237, filed on Jun. 12, 2009.

(30) Foreign Application Priority Data

Jul. 4, 2008 (DE) .......................... 10 2008 031 719

(51) Int. Cl.
*G06F 3/00* (2006.01)
*B60K 35/00* (2006.01)
(Continued)

(52) U.S. Cl.
CPC .............. *B60K 35/00* (2013.01); *B60K 37/06* (2013.01); *G06F 3/0482* (2013.01);
(Continued)

(58) Field of Classification Search
CPC ................................ G06F 3/048; G06F 3/0482
(Continued)

(56) References Cited

U.S. PATENT DOCUMENTS 6,587,130 B1 7/2003 Amari et al.
6,661,437 B1 * 12/2003 Miller et al. .................. 715/810
(Continued)

FOREIGN PATENT DOCUMENTS

DE 199 53 855 A1 5/2000
DE 102 07 872 A1 9/2003
(Continued)

OTHER PUBLICATIONS

Audi AG, Audi A6/A6 Avant Quick Reference Guide, 2007, pp. 1-8.*
(Continued)

*Primary Examiner* — Kieu D Vu
*Assistant Examiner* — Andrew Chung
(74) *Attorney, Agent, or Firm* — Crowell & Moring LLP

(57) ABSTRACT

A motor vehicle operating device has a display device, an operating element and a control device, which are mutually coupled and set up such that an operating element symbol that corresponds to the operating element with respect to its outline shape is displayed on the display device. Menu items of a hierarchical menu structure can be selected by use of the operating element. A selection of a menu item from a plurality of menu items that can be made based on a rotating degree of freedom of the operating element is displayed with a line extending from the operating element symbol in the direction of a first menu item representation which is part of a plurality of selectable menu item representations.

21 Claims, 4 Drawing Sheets

(51) Int. Cl.
  *G06F 3/0482* (2013.01)
  *B60K 37/06* (2006.01)
  *G06F 3/048* (2013.01)

(52) U.S. Cl.
  CPC .......................... *B60K 2350/1004* (2013.01); *B60K 2350/108* (2013.01); *G06F 3/048* (2013.01)

(58) Field of Classification Search
  USPC ................................................ 715/810, 822
  See application file for complete search history.

(56) References Cited

U.S. PATENT DOCUMENTS

| | | | |
|---|---|---|---|
| 6,847,357 B2* | 1/2005 | Lee ............................... | 345/184 |
| 2006/0025920 A1* | 2/2006 | Nezu et al. ................... | 701/200 |
| 2006/0250577 A1* | 11/2006 | Cieler et al. .................. | 351/210 |
| 2006/0279541 A1* | 12/2006 | Kim et al. ..................... | 345/158 |
| 2007/0136690 A1* | 6/2007 | MacLaurin et al. .......... | 715/822 |
| 2007/0226648 A1* | 9/2007 | Hudson et al. ................ | 715/810 |
| 2008/0216005 A1* | 9/2008 | Bamba et al. ................. | 715/765 |

FOREIGN PATENT DOCUMENTS

| | | |
|---|---|---|
| EP | 0 893 750 B1 | 1/1999 |
| EP | 1 247 686 A2 | 10/2002 |

OTHER PUBLICATIONS

BMW, Owner's Manual for Vehicle, Feb. 2007, pp. 16-21.*
International Search Report dated Sep. 9, 2009 including English-language translation (Four (4) pages).

* cited by examiner

MOTOR VEHICLE OPERATING DEVICE

CROSS REFERENCE TO RELATED APPLICATIONS

This application is a continuation of PCT International Application No. PCT/EP2009/004237, filed Jun. 12, 2009, which claims priority under 35 U.S.C. § 119 from German Patent Application No. DE 10 2008 031 719.5, filed Jul. 4, 2008, the entire disclosures of which are herein expressly incorporated by reference.

This application contains subject matter related to U.S. application Ser. No. 12/983,498, entitled "Motor Vehicle Operating Device," filed on even date herewith.

BACKGROUND AND SUMMARY OF THE INVENTION

The invention relates to a motor vehicle operating device.

Increasingly, modern motor vehicles have an operating device constructed separately from a display device in the area of the center console. Such an operating device is known, for example, from European patent document EP 0893750 B1. In this case, the operating device has a switching element which can be bidirectionally rotated about its axis of symmetry and which, in addition, is disposed in an axially movable (pushable) and tilting or slidable manner. As a result, by means of a rotating, pushing and/or tilting/sliding of the switching element, for example, menu items can be marked and selected or parameters can be set on a display device.

It is now an object of the invention to provide an improved motor vehicle operating device.

This and other objects are achieved by a motor vehicle operating device according to the invention having a display device, an operating element and a control device which are mutually coupled and set up with respect to the hardware and/or the program such that the display device shows an operating element symbol which corresponds to the operating element with respect to the outline shape (for example, a circle).

By use of the operating element, particularly by a rotating of the operating element, menu items of a hierarchical menu structure can be marked or selected.

A selection of a first menu item from a plurality of menu items, which can be made based on a rotating degree of freedom of the operating element, is displayed in that a line is displayed extending from the operating element symbol in the direction of a first or selected menu item representation, which is part of a plurality of selectable menu item representations.

The driver thereby recognizes by means of which operating degree of freedom menu items can be instantaneously selected and which menu item is instantaneously selected or marked. In addition, the driver easily recognizes on the basis of which rotating direction a desired menu item can be selected starting from the instantaneously selected menu item. This is the result of the display of the arrangement of the operating element symbol relative to the menu item representations and facilitates the reliable, fast and error-free selection of menu items particularly during the drive. This advantage is still intensified by the following further developments.

The menu item representation, which is part of a plurality of selectable menu item representations and in whose direction the line display extends that starts from the operating element, preferably takes place in a highlighted manner.

An operating action corresponding to the rotating degree of freedom preferably has the effect that, starting from the operating element symbol, a line is displayed in the direction of a menu item representation which is adjacent to the menu item representation presently selected and which is part of a plurality of selectable menu item representations (no longer in the direction of the menu item representation selected so far).

An operating action corresponding to the rotating degree of freedom preferably has the effect that the menu item representation which is adjacent to the menu item representation selected so far (i.e., the menu item presently selected) and is part of a plurality of selectable menu item representations and in whose direction the line display extends which starts from the operating element, is displayed in a highlighted manner (no longer the menu item representation selected so far).

It is preferably provided that a final selection of the menu item, whose pertaining menu item representation takes place in a highlighted manner and in whose direction the line display extends which starts from the operating element, is made by a pushing on the operating element.

In the case of the simultaneous representation of different menu levels, of which one menu level is active (or selected; marked, for example, by a highlighted representation of the menu level), the operating element symbol is preferably always displayed in a manner assigned to the active menu level. The operating element symbol is, for example, displayed in the proximity of the active menu level, completely or partially superimposed on the active menu level and/or in a void of the menu level representation provided for this purpose.

It is particularly preferred that, as a result of a movement of the operating element in a direction which, starting from the display of the operating symbol, corresponds to the direction of a representation of a further menu level, the further menu level will become active (the previously active menu level will become inactive) and the operating element symbol will be displayed in a manner assigned to this now active menu level.

Other objects, advantages and novel features of the present invention will become apparent from the following detailed description of one or more preferred embodiments when considered in conjunction with the accompanying drawings.

DETAILED DESCRIPTION OF THE DRAWING

Figure 1:
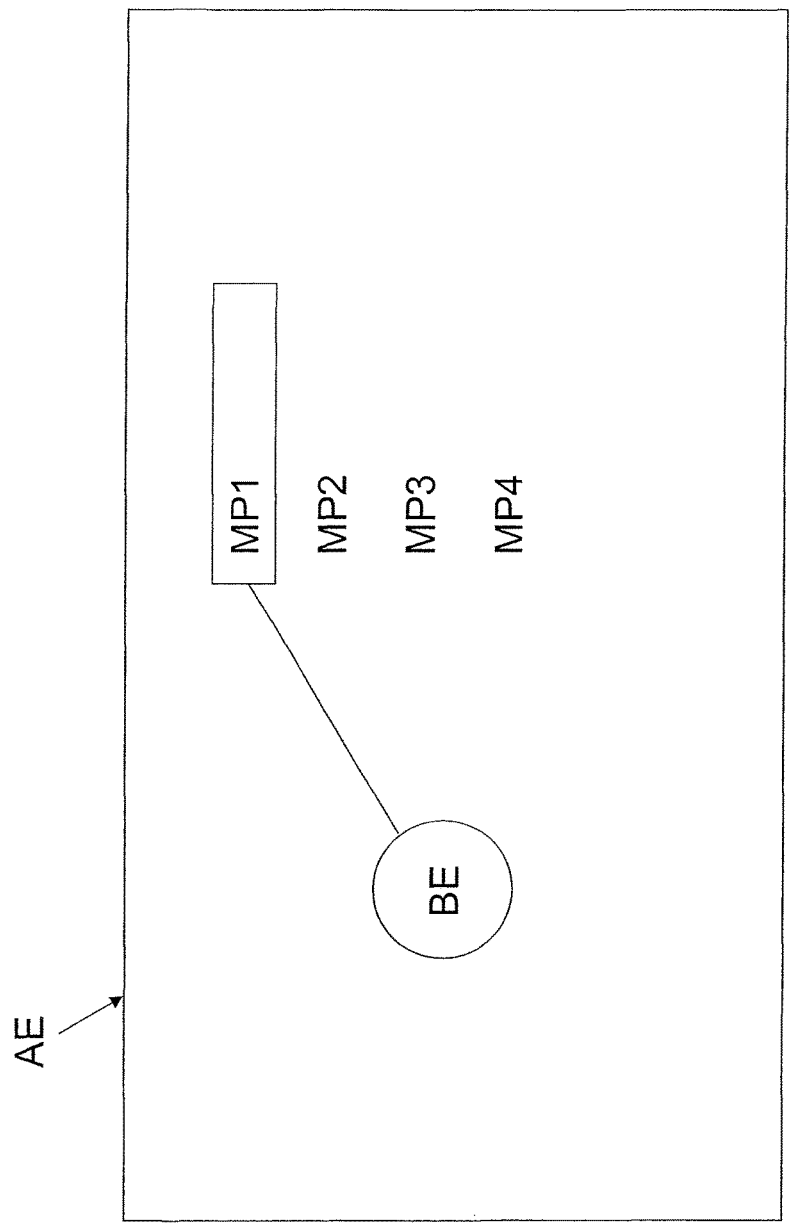
FIGS. 1 and 2 are views of a menu item selection display in accordance with an exemplary embodiment of the invention.

FIG. 1 illustrates a display device AE as part of a motor vehicle operating device, which also includes an operating element and a control device.

Operating element symbol BE is displayed which symbolizes an operating element arranged offset from the display device AE. A menu item can be selected from a plurality of menu items by rotation of the operating element.

This selection possibility and the instantaneously selected menu item are displayed to the driver in that, starting from the operating element symbol BE, a line is displayed to the instantaneously selected menu item representation MP1. In addition, this menu item representation MP1 takes place in a highlighted, here, "framed" manner using a rectangular box frame. The line extends from the operating element symbol BE to the frame which surrounds the selected menu item representation MP1.

Figure 2:
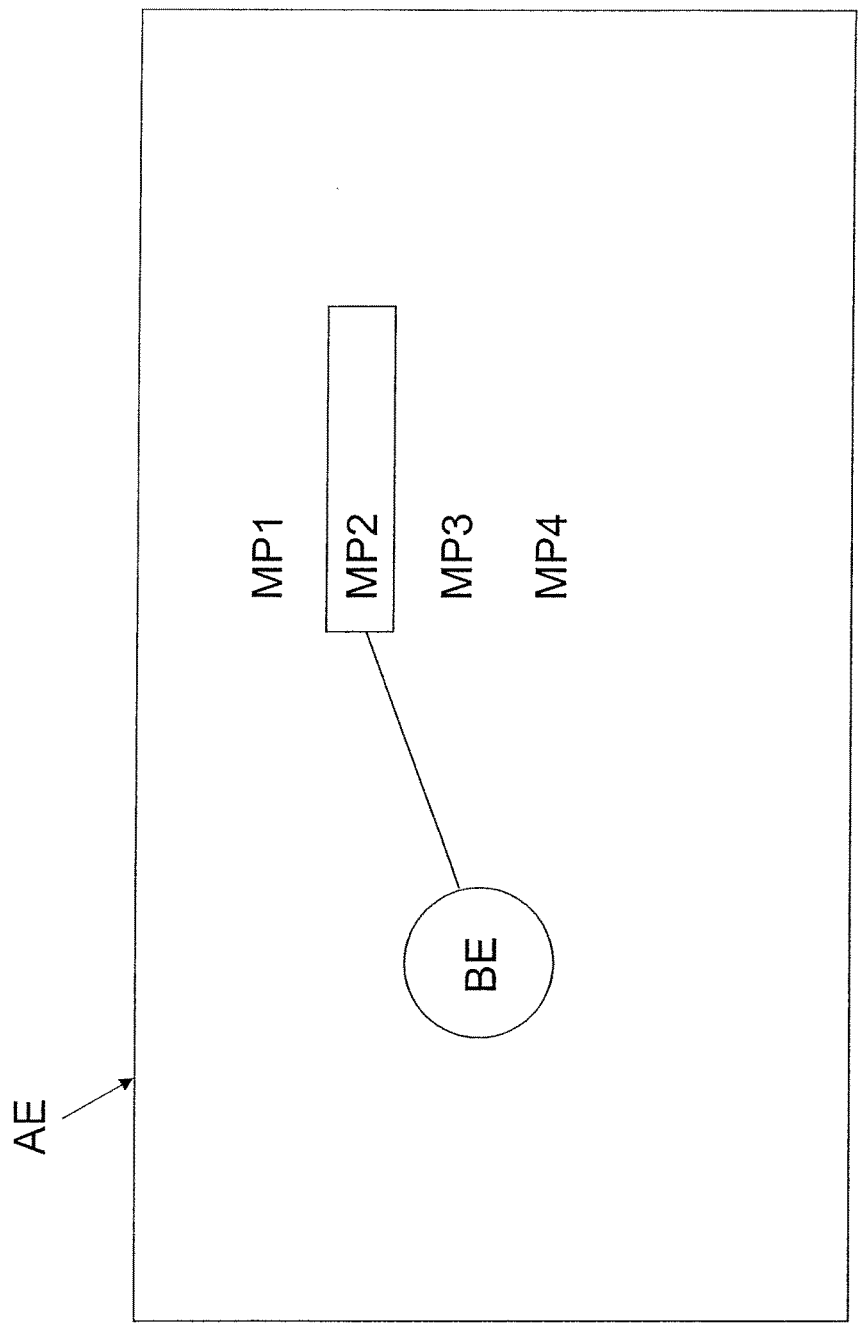

Starting from the display status according to FIG. 1, the display status according to FIG. 2 is obtained by a clockwise rotation of the operating element. The menu item representation MP2 is now selected. This is displayed to the driver in that the frame now surrounds the selected menu item representation MP2 and that, starting from the operating element symbol BE, the line extends to this frame.

Figure 3:
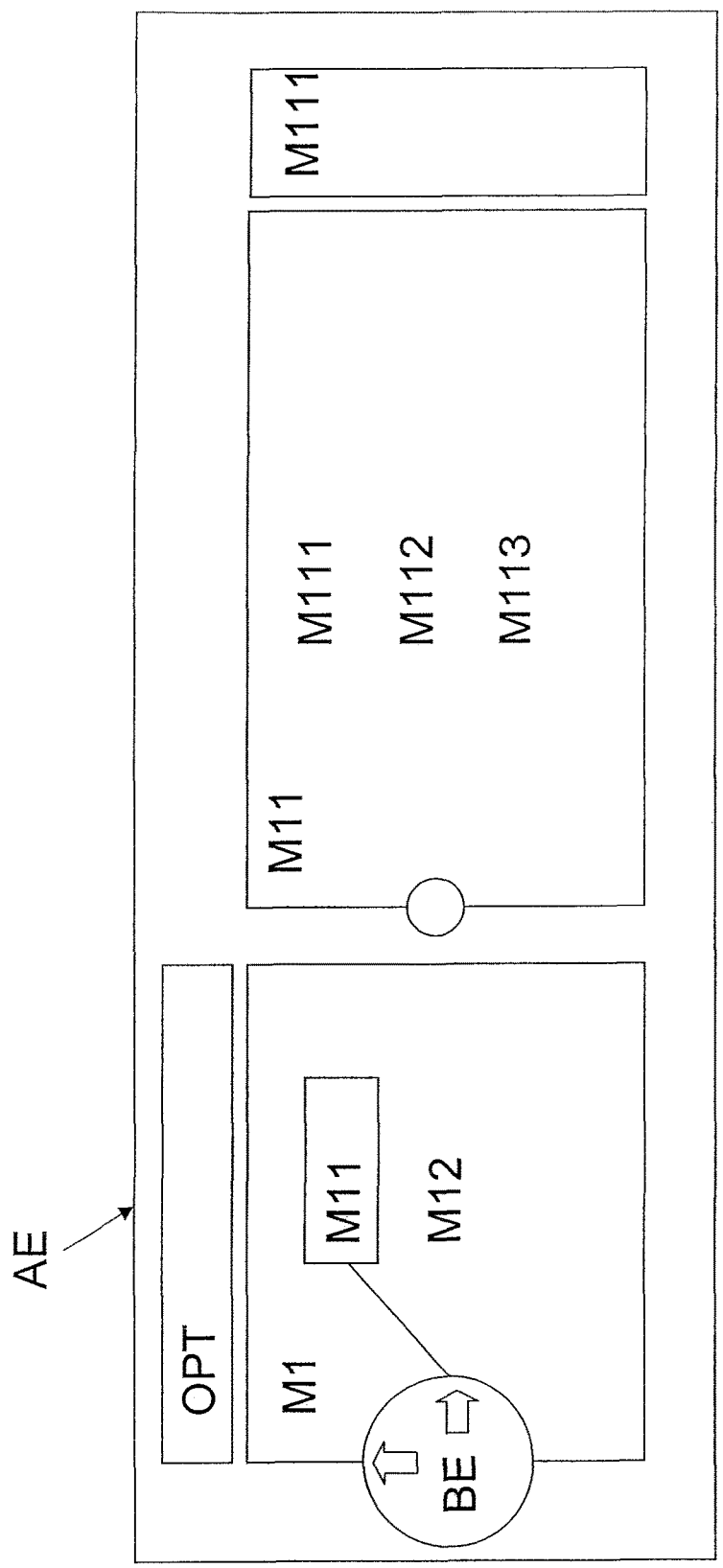
FIGS. 3 and 4 are views of two display statuses of an operating device in accordance with an exemplary embodiment of the invention.

FIG. 3 shows a display device AE as part of a motor vehicle operating device which also includes an operating element and a control device.

The operating element (not shown) may, for example, be a rotary, push, tilt (rocker or slide) element that is known per se and can basically be operated corresponding to a plurality of operating degrees of freedom (one or more rotating degrees of freedom and/or a pushing degree of freedom and/or one or more tilting or sliding degrees of freedom). By use of the operating element, a user can navigate through a hierarchical menu structure displayed on the display device AE.

An operating element symbol BE is displayed on the display device AE, which operating element symbol BE corresponds to the operating element with respect to its outline shape (or in some other user readily recognized corresponding fashion) and is therefore displayed here in a circular shape.

Different groups of operating degrees of freedom are enabled for the navigation at different locations of the hierarchical menu structure. As an example, FIG. 3 shows a first location of the hierarchical menu structure which is coupled, for example, with a first display status (or operating status).

Three menu levels M1, M11, M111 are displayed at this location of the hierarchical menu structure. In addition, an option menu OPT is displayed, which is part of menu level M1.

The instantaneously active or selected menu level M1 is displayed in a highlighted fashion (for example, in a particularly bright, high-contrast or especially colored fashion). Furthermore, the operating element symbol BE is displayed to be superimposed on this active menu level M1.

The operating degrees of freedom of the operating element enabled or usable at this location of the menu structure are displayed on the operating element symbol BE: The arrows symbols point to a possible tilting or sliding of the operating element in the upward direction (or forward) and toward the right. Operating degrees of freedom not enabled at the current location of the menu structure (for example, "sliding toward the left") are not displayed.

The selection of a menu item from a plurality of menu items that can be made based on a rotating degree of freedom of the operating element is displayed in that, starting from the operating element symbol BE, a line is displayed in the direction of a first menu item representation M11, which is part of a plurality of selectable menu item representations M11, M12.

An embodiment not illustrated in the figure provides that the tilting/sliding degrees of freedom are not displayed but only one of the rotating degrees of freedom are displayed.

The first menu item representation M11 is carried out in a highlighted, here, "framed" manner using a rectangular box frame.

Figure 4:
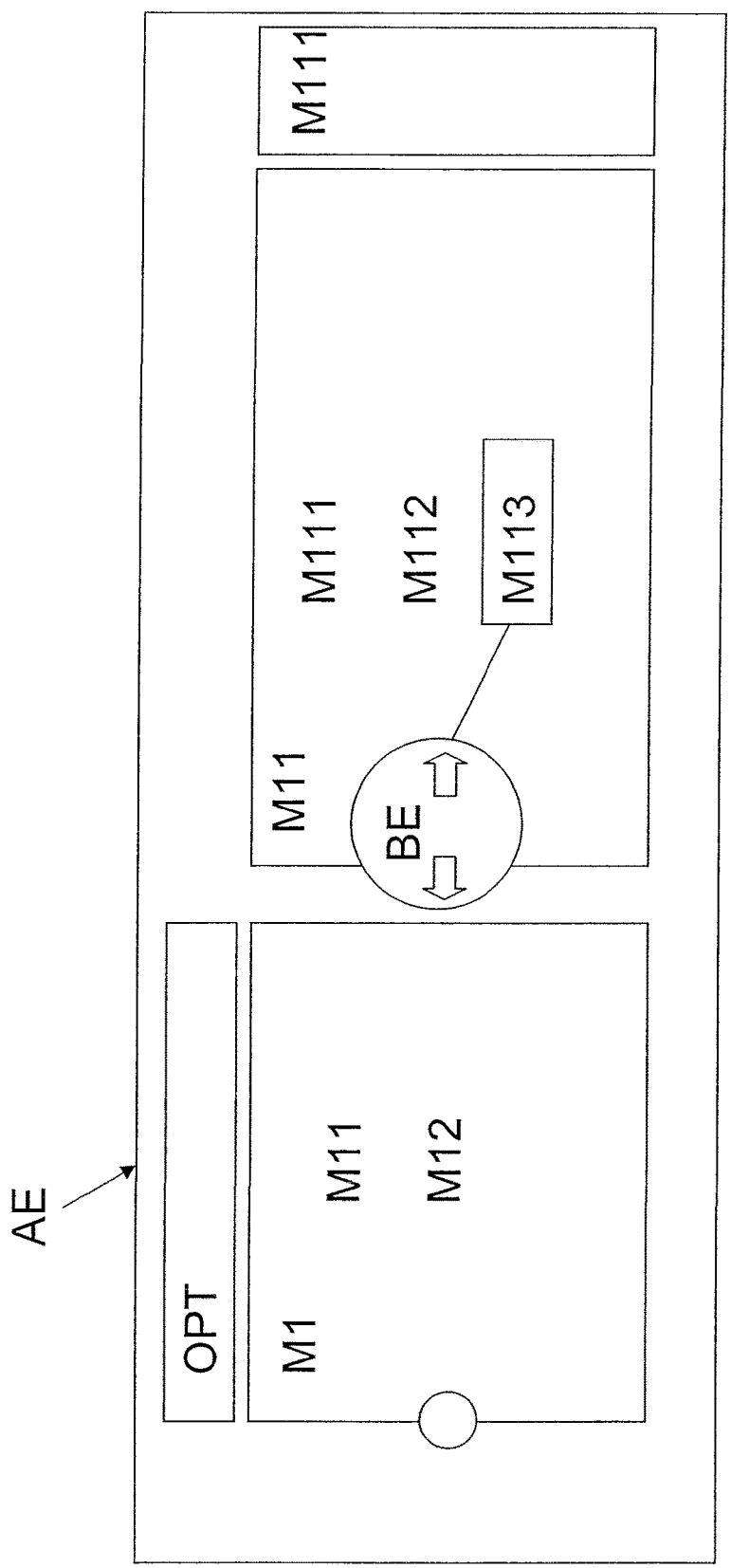

As a result of a movement of the operating element in a direction which, based on the display of the operating symbol BE, corresponds to the direction of a representation of a further menu level OPT, M11, the further menu level becomes active and the operating element symbol BE is displayed to be assigned to this now active menu level. For example, a display status is illustrated in FIG. 4 which is obtained when, based on the display status according to FIG. 3, the operating element is moved to the right.

Now, the menu level corresponding to the menu level representation M11 will be active. Menu level M1 will no longer be active. The operating element symbol BE will be superimposed on the now active menu level representation M11. A rotating degree of freedom is enabled again next to the two tilting degrees of freedom (arrow left, arrow right). However, now the rotating degree of freedom relates to menu items M111, M112, M113 of menu level M11, as indicated by the line display starting from the operating element symbol BE.

Menu item M113 is marked or selected. A pushing of the operating element now causes a confirmation of the selection of this menu item 113.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle operating device, comprising:
   a display device;
   an operating element; and
   a control device, the display device, operating element and control device being operatively configured such that an operating element symbol, having an outlined shape that corresponds to a shape of the operating element, is displayed on each of a plurality of menu levels that are displayed on the display device, menu items of hierarchical menu structure being selectable using the operating element, wherein
   selection of a menu item from a plurality of menu items selectable based upon a rotating degree of freedom of the operating element is displayed with a line extending from the operating element symbol in a direction of a selected menu item representation which is part of a plurality of selectable menu item representations, such that an orientation of the line between the operating element symbol and each menu item is different,
   an operating degree of freedom, corresponding to different enabled operations of the operating element that when executed lead from one menu level or from one hierarchical menu structure to another menu level or to another hierarchical menu structure, is displayed within the operating element symbol, and
   multiple menu levels or hierarchical menu structures are concurrently displayed on the display device.

2. The motor vehicle operating device according to claim 1, wherein the menu item representation in whose direction the line extends starting from the operating element is highlighted.

3. The motor vehicle operating device according to claim 2, wherein an operating action corresponding to the rotating degree of freedom affects the line such that the line is displayed in a direction of a menu item representation adjacent to the previously selected menu item representation and which is a part of the plurality of selectable menu item representations.

4. The motor vehicle operating device according to claim 3, wherein the adjacent menu item representation is highlighted.

5. The motor vehicle operating device according to claim 2, wherein the operating element symbol is displayed in a manner assigned to an active menu level when different menu levels are simultaneously represented of which one menu level is active.

6. The motor vehicle operating device according to claim 1, wherein an operating action corresponding to the rotating degree of freedom affects the line such that the line is displayed in a direction of a menu item representation adjacent to the previously selected menu item representation and which is a part of the plurality of selectable menu item representations.

7. The motor vehicle operating device according to claim 6, wherein the adjacent menu item representation is highlighted.

8. The motor vehicle operating device according to claim 6, wherein the operating element symbol is displayed in a manner assigned to an active menu level when different menu levels are simultaneously represented of which one menu level is active.

9. The motor vehicle operating device according to claim 1, wherein confirmation of the selection of the menu item occurs upon a pushing of the operating element.

10. The motor vehicle operating device according to claim 1, wherein the operating element symbol is displayed in a manner assigned to an active menu level when different menu levels are simultaneously represented of which one menu level is active.

11. The motor vehicle operating device according to claim 10, wherein movement of the operating element in a direction from the operating element symbol displayed corresponding to a direction of a representation of a further menu level activates the further menu level and displays the operating element symbol in a manner assigned to the activated further menu level.

12. The motor vehicle operating device according to claim 1, wherein the operating degree of freedom is a directional indicator that is displayed within the operating element symbol and that informs a user of one or more directions in which the operating element may be moved to access an enabled menu level or hierarchical menu structure.

13. A display for a motor vehicle having an operating element with a rotational degree of freedom, menu items of a hierarchical menu structure being selectable with the operating element, the display comprising:
an operating element symbol on the display, the operating element symbol: i) corresponding to the operating element in a user recognized manner, and ii) being displayed on each of a plurality of menu levels that are displayed on the display; and
a plurality of selectable menu item representations on the display, wherein
a line on the display extends from the operating element symbol in a direction of a selected menu item representation made based upon a rotational degree of freedom of the operating element, such that an orientation of the line between the operating element symbol and each selectable menu item representation is different,
an operating degree of freedom, corresponding to different enabled operations of the operating element that when executed lead from one menu level or from one hierarchical menu structure to another menu level or to another hierarchical menu structure, is displayed within the operating element symbol, and
multiple menu levels or hierarchical menu structures are concurrently displayed on the display device.

14. The display according to claim 13, further comprising highlighting of the menu item representation in whose direction the line extends from the operating element symbol.

15. The display according to claim 14, further comprising a simultaneous representation of different menu levels, of which one menu level is active, wherein the operating element symbol is displayed in a manner assigned to the one active menu level.

16. The display according to claim 13, further comprising a simultaneous representation of different menu levels, of which one menu level is active, wherein the operating element symbol is displayed in a manner assigned to the one active menu level.

17. A method of operating a display in a motor vehicle using an operating element having at least a rotational degree of freedom, the method comprising the acts of:
displaying a plurality of selectable menu item representations corresponding to menu items selectable based upon rotation of the operating element;
displaying an operating element symbol, corresponding to the operating element in a user recognized manner, in each of a plurality of menu levels that are displayed on the display; and
displaying with a line extending from the operating element symbol in a direction of a menu item representation that is selected based upon the rotation of the operating element, wherein
an orientation of the line between the operating element symbol and each menu item representation is different,
an operating degree of freedom, corresponding to different enabled operations of the operating element, that when executed lead from one menu level or from one hierarchical menu structure to another menu level or to another hierarchical menu structure, is displayed within the operating element symbol, and
multiple menu levels or hierarchical menu structures are concurrently displayed on the display device.

18. The method according to claim 17, further comprising the act of highlighting the selected menu item representation in whose direction the line extends from the operating element symbol.

19. The method according to claim 18, further comprising the acts of:
receiving a signal from the operating element corresponding to a rotational direction of the operating element; and
displaying the line in a direction of a menu item representation adjacent to the previously selected menu item representation in a direction corresponding to the rotational direction of the operating element.

20. The method according to claim 17, further comprising the acts of:
receiving a signal from the operating element corresponding to a rotational direction of the operating element; and
displaying the line in a direction of a menu item representation adjacent to the previously selected menu item representation in a direction corresponding to the rotational direction of the operating element.

21. The method according to claim 17, further comprising the acts of:
   displaying representations of different menu levels simultaneously; and
   displaying the operating element symbol in a manner assigned to an active one of the different menu levels.

\* \* \* \* \*